March 29, 1932.  L. T. NEIDOW  1,851,723

SWIVEL JOINT

Filed Feb. 14, 1927

Inventor:
Leo T. Neidow,
By Glenn S. Noble
Atty.

Patented Mar. 29, 1932                                                                    1,851,723

UNITED STATES PATENT OFFICE

LEO T. NEIDOW, OF CHICAGO, ILLINOIS

SWIVEL JOINT

Application filed February 14, 1927. Serial No. 168,121.

This invention relates to pneumatic devices which are adapted for operating chucks for lathes or the like and is particularly directed to means for conducting air to the piston and to packing means for holding air at the several places where it is desirable to prevent the escape of the same.

The objects of this invention are to provide an improved pneumatic air power device for operating chucks or the like; to provide an air cylinder having novel means for controlling the admission and exhaust of the air; to provide improved packing or air holding device for the intake and outlet ports and also for the piston and piston rod; to provide a ball bearing sleeve or housing for the inlet and outlet passageways or conduits; and to provide such other novel features and improvements in construction as will appear more fully from the following description and claims.

Figure 1:
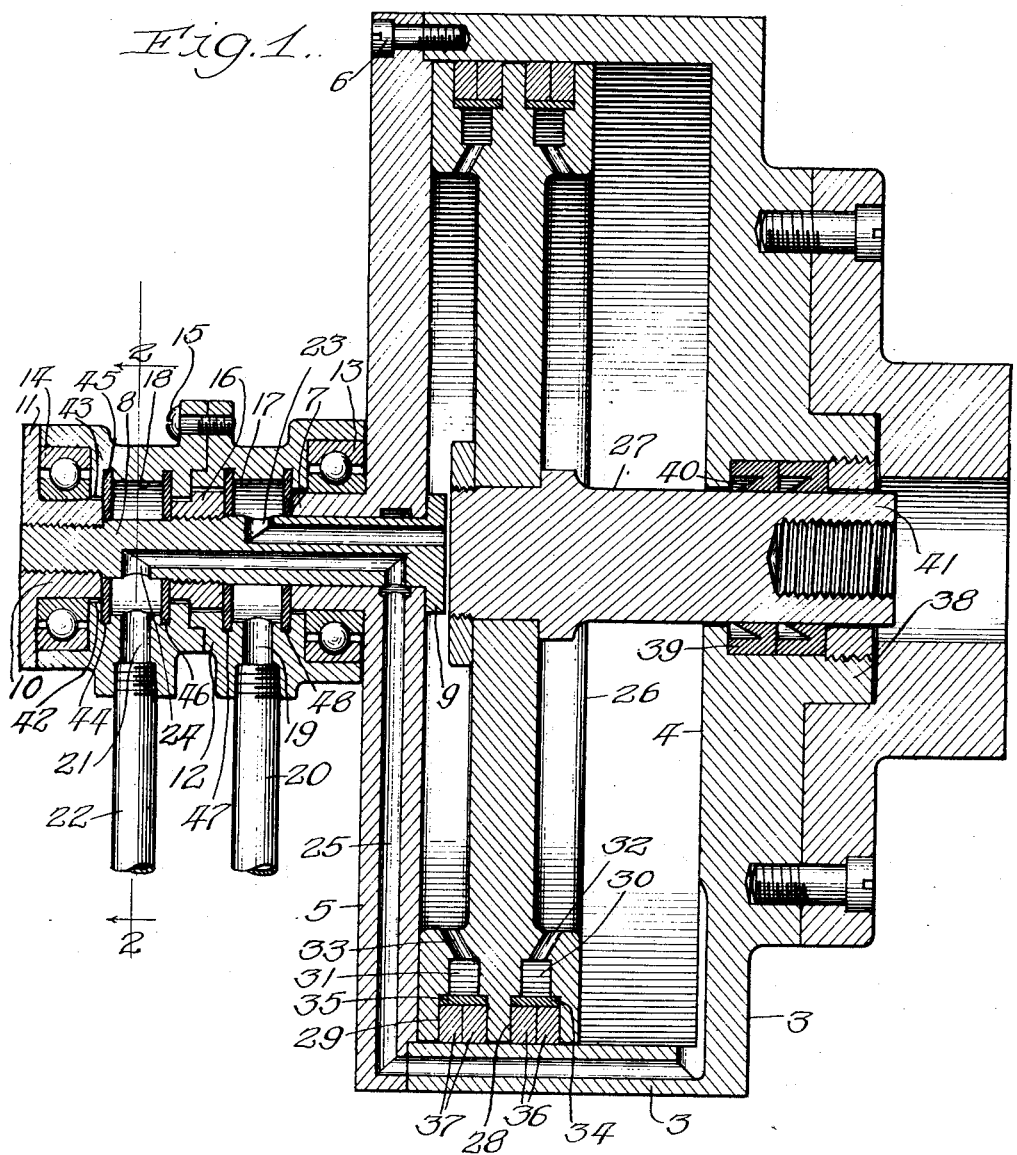
Figure 2:
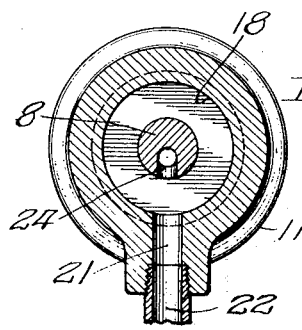

In the accompanying drawings illustrating this invention;

Figure 1 is a longitudinal sectional view of an air cylinder embodying my improved features; and Figure 2 is a sectional view taken on the line 2—2 of Figure 1.

The air cylinder 3 as shown in these drawings is adapted to be secured to the machine with which it is to be used in the usual manner so that it rotates with the chuck (not shown) or other device which is actuated thereby. The cylinder 3 has a head 4 at one end which is preferably formed integrally therewith and a removable head 5 at the opposite end which is held by studs or bolts 6. The head 5 is provided with a hub 7 having a spindle or shaft 8 securely fitted therein. The spindle 8 is provided with a head 9 at its inner end and is threaded at its outer end to receive a correspondingly threaded collar or bearing 10 having an outwardly projecting flange 11. A sleeve or housing 12 is mounted on the hub 7 and collar 10 and is preferably carried on ball bearings 13 and 14. This sleeve is preferably made in two parts for constructional and assembling purposes, these parts being held together by screws or bolts 15. The spindle 8 is threaded intermediate of its bearings to receive a correspondingly threaded ring or collar 16 which divides the space in the housing 12 into two annular chambers 17 and 18. The chamber 17 has a port 19 which connects with a pipe 20 which is threaded to engage with a boss on the housing. The chamber 18 also has a port 21 which connects with a pipe 22 which is threaded to engage with another boss on the housing 12. The pipes 20 and 22 are connected with the source of supply of compressed air in the usual manner, the arrangement being such that when air is admitted through one pipe, it will be exhausted through the other pipe, and vice versa so that each pipe or inlet acts both as an intake and as an exhaust.

The chamber 17 is connected by means of a port or passageway 23 through the spindle 8 with one end of the cylinder 3.

The chamber 18 is connected by a port or passageway 24 through the spindle 8, with a port or passageway 25 which leads through the cylinder head 5 and outer wall of the cylinder to the opposite end of the cylinder.

The cylinder is provided with a piston 26 having a piston rod 27 which is adapted to be connected with the draw rod of the chuck or to any other device to be actuated thereby. The outer surface or periphery of the piston has two annular grooves 28 and 29 which connect respectively with narrower grooves 30 and 31. Holes 32 and 33 lead from the latter grooves to the corresponding sides of the piston, as will be readily seen from Figure 1. Rings or bands 34 and 35 fit closely within the grooves 28 and 29 and rest against the shoulders formed at the junction of these grooves with the narrower grooves 30 and 31. These rings or bands may be made of any suitable material but are preferably made of rubber or rubber composition. The remaining spaces in the grooves 28 and 29 are filled with packing rings 36 and 37, which may be made of any suitable packing materials and which engage with the inner wall of the cylinder. It will be seen that with this arrangement when air is admitted on either side of the piston, it will pass through the corresponding holes of the inner groove and will tend to force the band or ring outwardly against the packing, and consequently press the packing against the cylinder walls so as to make the piston air tight when it is being driven in either direction.

The piston rod 27 passes through the hub 38 and is provided with the novel packing rings or gland construction shown. One or more packing rings 39 are provided which have V-shaped slots 40 which open toward the cylinder so that the air may enter such slots and will tend to press the tapered or thin engaging portion of the ring against the rod. These packing rings are held by means of a threaded ring 41 which engages with the hub and is adapted to press them together and against the rod.

In an apparatus of this kind, the air pipes and the sleeve or housing with which they are connected must, of course, remain stationary while the cylinder rotates at comparatively high speed. On account of having to admit air under comparatively high pressure to the cylinder and also to exhaust air therefrom through such moving and stationary parts, it has been found very difficult to prevent leakage of the air or to provide packing which will last for any considerable length of time. One of the particularly important features of this invention is the arrangement of sealing these relatively moving and stationary parts or providing packing for the joints which will effectively prevent the loss of air and which will be apt to last for a considerable length of time. It will be seen that the joint or opening 42 between the collar 10 and the inwardly extending flange or projection 43 at the end of the chamber 18 is approximately midway between the surface of the spindle and the outer wall of the chamber. In order to make this an air-tight joint, I provide a washer 44 which is preferably let into a groove 45 in the housing 8 and fits closely against the joint or opening so as to cover or seal the same. This washer may be made of any suitable material but is preferably made of leather which I have found to be most satisfactory for this purpose. It will be seen that this washer practically forms an end for the chamber 18 and preferably remains stationary with the housing and is pressed against the adjacent end of the collar 10 by the air. The opposite end of the chamber 18 is provided with a similar washer 46, and the ends of the chamber 17 are provided with similar washers 47 and 48, but as these are all constructed and operate the same as the washer 44, further description will not be necessary.

When the cylinder is to be moved to the right, as shown in Figure 1, air is admitted through the pipe 20 to the chamber 17 and then passes through the port 23 to the left hand end of the cylinder and causes the piston to move to the right. At the same time the air in the right hand end of the cylinder is driven outwardly through the ports 25 and 24 to the chamber 18 and then escapes through the pipe 22. When the piston is to be moved to the left, the air will of course be conducted in the reverse directions. The provision of the ball bearings at each end of the housing tends to hold the housing and rotating parts in proper alignment so as to prevent binding or friction or heating and thereby aids in increasing the operating life of the parts, and particularly the packing devices.

These cylinders are made in various sizes for different kinds of work and changes may be made in order to adapt the same for different conditions, and therefore I do not wish to be limited to the exact arrangement herein shown and described, except as specified in the following claims, in which I claim:

1. The combination with a spindle for a rotatable member having passageways for admitting air thereto and exhausting it therefrom, of a stationary housing having air passageways to coact with the spindle passageways, washers formed of leather or the like with their faces engaging with adjacent portions of the stationary and movable parts for closing the joints between such parts and bearings between the stationary and movable parts which are at a distance remote from the joints closed by said washers.

2. The combination with a spindle for a rotatable member adapted to receive air under pressure, said spindle having air ports therethrough, of a stationary housing mounted on said spindle, means coacting with the spindle and housing for forming chambers which are adapted to register with the ports in the spindle, said means including washers having flat faces which coact with adjacent portions of the movable and stationary parts to prevent the escape of air, pipes connected with said chambers and bearings for said spindle at the ends of the housing beyond said air-confining means.

3. The combination of a spindle for an air cylinder or the like, having air inlet and outlet ports, a stationary housing around the spindle having inwardly extending annular projections, projections on the spindle coacting with the projections on the housing to form two chambers around the spindle, washers engaging with grooves in the housing and covering the joints between the housing and spindle members, said chambers registering with the ports in the spindle, pipes leading to said chambers, and ball bearings at the ends of the housing.

4. In an apparatus of the character set forth, the combination of a stationary housing, a spindle projecting through said housing, ball bearings for said spindle arranged at either end of the housing to provide a relatively long bearing, air inlet and outlet passageways through the housing and spindle, and packed joints arranged between the bearings whereby the packing closes openings that are different from those required by the bearings.

5. The combination with a sleeve, of a spindle rotatably mounted therein, coacting passageways through the sleeve and the spindle for the passage of pressure fluid joints between the sleeve and the spindle adjacent to the passageways, packing washers for closing said joints, and bearings between the stationary and movable parts which are independent of the joints and which are positioned at a sufficient distance from the joints to prevent heating at the joints.

LEO T. NEIDOW.